US012485576B2

(12) United States Patent
Perlin

(10) Patent No.: US 12,485,576 B2
(45) Date of Patent: Dec. 2, 2025

(54) MULTI-PERSON MIXED REALITY EXPERIENCE, METHOD AND APPARATUS

(71) Applicant: Kenneth Perlin, New York, NY (US)

(72) Inventor: Kenneth Perlin, New York, NY (US)

( * ) Notice: Subject to any disclaimer, the term of this patent is extended or adjusted under 35 U.S.C. 154(b) by 188 days.

(21) Appl. No.: 18/135,496

(22) Filed: Apr. 17, 2023

(65) Prior Publication Data

US 2023/0343041 A1 Oct. 26, 2023

Related U.S. Application Data

(60) Provisional application No. 63/334,060, filed on Apr. 22, 2022.

(51) Int. Cl.
| | | |
|---|---|---|
| *B28B 11/04* | (2006.01) | |
| *B28B 1/00* | (2006.01) | |
| *B28B 1/30* | (2006.01) | |
| *E01C 5/16* | (2006.01) | |
| *E01C 9/00* | (2006.01) | |
| *E01C 11/24* | (2006.01) | |
| *G02B 27/01* | (2006.01) | |
| *G06F 3/0346* | (2013.01) | |
| *G06T 19/00* | (2011.01) | |
| *G06T 19/20* | (2011.01) | |
| *E01C 11/26* | (2006.01) | |

(52) U.S. Cl.
CPC ............ *B28B 11/042* (2013.01); *B28B 1/008* (2013.01); *B28B 1/30* (2013.01); *E01C 5/16* (2013.01); *E01C 9/002* (2013.01); *E01C 11/24* (2013.01); *G02B 27/0172* (2013.01); *G06F 3/0346* (2013.01); *G06T 19/006* (2013.01); *G06T 19/20* (2013.01); *E01C 11/26* (2013.01); *G06T 2219/024* (2013.01); *G06T 2219/2012* (2013.01)

(58) Field of Classification Search
CPC . E01C 9/002; E01C 11/24; E01C 5/16; E01C 11/26; G06F 3/011; G06F 3/0346; G06F 3/012; G06F 3/017; B28B 1/008; B28B 1/30; B28B 11/042; G06T 19/006; G06T 19/20; G06T 2219/024; G06T 2219/2012; G06T 19/00; G06T 2219/2016; G02B 27/0172; G02B 2027/0138; G06V 20/653; G06V 40/20

See application file for complete search history.

(56) References Cited

U.S. PATENT DOCUMENTS

| | | | | |
|---|---|---|---|---|
| 11,265,721 | B1 * | 3/2022 | Satpathy | G02B 30/22 |
| 2020/0051336 | A1 * | 2/2020 | Ichikawa | G06T 19/006 |
| 2020/0169715 | A1 * | 5/2020 | Liu | H04N 13/117 |
| 2020/0169718 | A1 * | 5/2020 | Begeja | G06V 20/48 |

(Continued)

*Primary Examiner* — Xilin Guo
(74) *Attorney, Agent, or Firm* — Ansel M. Schwartz

(57) ABSTRACT

An apparatus for viewing in a structure having a first participant and at least a second participant having a first VR headset to be worn by the first participant, and a second VR headset to be worn by the second participant. Each participant sees every other participant in the structure as every other participant physically appears in the structure in real time in a simulated world displayed about them by the respective VR headset each participant is wearing. Each participant sees the simulated world from their own correct perspective in the structure. The simulated world includes a near field and a far field. A method for a first participant and at least a second participant viewing in a structure.

17 Claims, 5 Drawing Sheets

(56) References Cited

U.S. PATENT DOCUMENTS

2023/0259194 A1* 8/2023 Geisert .............. G02B 27/0101
 345/633
2023/0290081 A1* 9/2023 Kawamae .............. H04N 7/157

* cited by examiner

MULTI-PERSON MIXED REALITY EXPERIENCE, METHOD AND APPARATUS

CROSS-REFERENCE TO RELATED APPLICATIONS

This is a nonprovisional application of U.S. provisional application Ser. No. 63/334,069, filed Apr. 22, 2022 which is related to U.S. provisional applications Ser. Nos. 63/148,283 filed Feb. 11, 2021; 63/225,860 filed Jul. 26, 2021; and 63/236,530 filed Aug. 24, 2021, and is a continuation in part of U.S. application Ser. No. 17/666,364 filed Feb. 7, 2022, all of which are incorporated by reference herein.

FIELD OF THE INVENTION

The present invention is related to multiple participants in a same structure, such as a room, wearing virtual reality headsets to share a computer simulated virtual world. (As used herein, references to the "present invention" or "invention" relate to exemplary embodiments and not necessarily to every embodiment encompassed by the appended claims.) More specifically, the present invention is related to multiple participants in the same structure wearing virtual reality headsets to share a computer simulated virtual world using a marker attached to the structure for the VR headsets to determine locations of the participants wearing the VR headsets, respectively, in the structure and their own correct perspective in the structure.

BACKGROUND OF THE INVENTION

There is currently no practical way for multiple people in the same room, each of whom is wearing a virtual reality (VR) headset that incorporates a front facing stereo camera pair, to see the other people in the room via video pass-through, while simultaneously making use of inside-out tracking to share a computer simulated virtual world so that each person in the room experiences that shared virtual world with full six degrees of freedom.

The reason for this limitation is that there is currently no practical way for such an inside-out tracked VR headset to distinguish between two categories of pixels of the image captured by each front-facing camera: (1) those pixels which capture other people in the room (the part of the captured image that people should continue to see), and (2) those pixels which capture the surrounding room (the part that should be replaced by a view into the shared virtual world).

It is insufficient to place people in a green screen room (which would make it easy for the VR headset's computer to distinguish between other people and the surrounding room) because then there would be insufficient visual features in the room to allow inside-out tracking to work properly.

BRIEF SUMMARY OF THE INVENTION

The present invention pertains to an apparatus for viewing in a structure having a first participant and at least a second participant. The apparatus comprises a first VR headset to be worn by the first participant. The first VR headset having an inertial motion unit, a first computer, and at least a first camera. The apparatus comprises a second VR headset to be worn by the second participant. The second VR headset having an inertial motion unit, a second computer, and at least a second camera. Each participant sees every other participant in the structure as every other participant physically appears in the structure in real time in a simulated world displayed about them by the respective VR headset each participant is wearing. Each participant sees the simulated world from their own correct perspective in the structure. The simulated world includes a near field and a far field. The first participant and the second participant interact differently with the near field than the far field. The apparatus includes a marker attached to the structure for the first and second VR headsets to determine locations of the first and second participants wearing the first and second VR headsets, respectively, in the structure and their own correct perspective in the structure. The apparatus includes coloring on at least a portion of the structure so the portion of the structure with coloring does not appear in the simulated world.

The present invention pertains to a method for a first participant and at least a second participant viewing in a structure. The method comprises the steps of the first participant and the second participant walking around together in a virtual world shown to the first participant by a first VR headset worn by the first participant and shown to the second participant by a second VR headset worn by the second participant. The virtual world is an entire world around them that is simulated and displayed in each VR headset. The first participant and the second participant are in physical sight of each other in the structure and see each other in the structure in the virtual world while viewing the virtual world. There is the step of the first participant and the second participant seeing the virtual world from their own correct perspective in the structure. The first VR headset having an inertial motion unit, a first computer, and at least a first camera. The second VR headset having an inertial motion unit, a second computer, and at least a second camera. The simulated world includes a near field and a far field. The first participant and the second participant interact differently with the near field than the far field. There is a marker attached to the structure for the first and second VR headsets to determine locations of the first and second participants wearing the first and second VR headsets, respectively, in the structure and their own correct perspective in the structure. There is coloring on at least a portion of the structure so the portion of the structure with coloring does not appear in the simulated world.

The present invention pertains to a capture unit for mounting on a VR headset worn by a participant. The capture unit comprises an Inertial Motion Unit. The capture unit comprises a processor in communication with the Inertial Motion Unit. The capture unit comprises a power source in communication with the processor and the Inertial Motion Unit. The capture unit comprises a stereo pair of forward-facing cameras to capture a video stream of stereo image pairs corresponding to a left eye and right eye of the participant. Each forward-facing camera in communication with the processor for the processor to receive the image pair. The processor compresses the captured stereo image pair data and measures orientation of the VR headset at a rate of about 1000 samples per second. The capture unit comprises a communication interface for digital communication to the VR headset.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
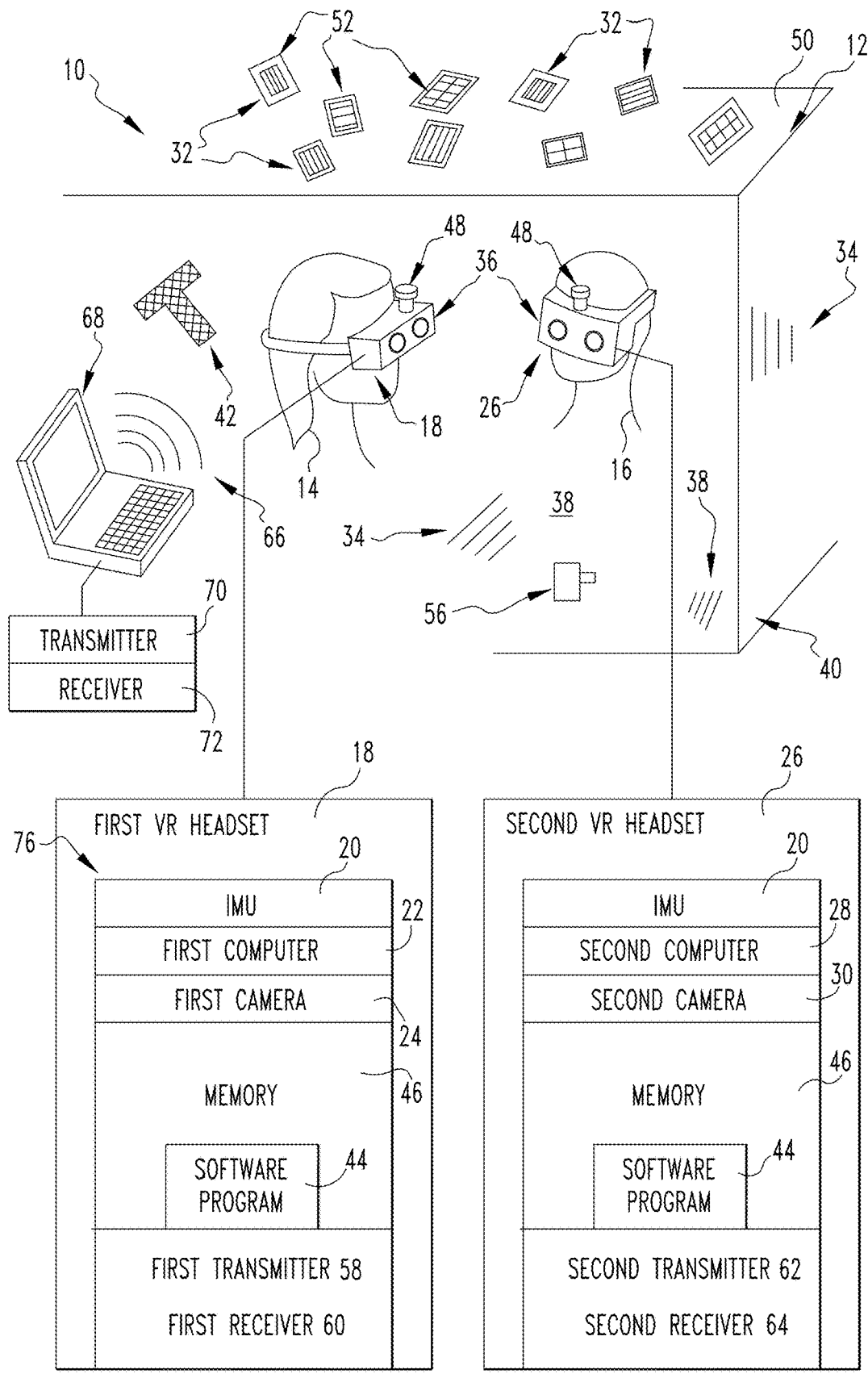
FIG. 1 is a schematic representation of the apparatus of the claimed invention.
Figure 8:
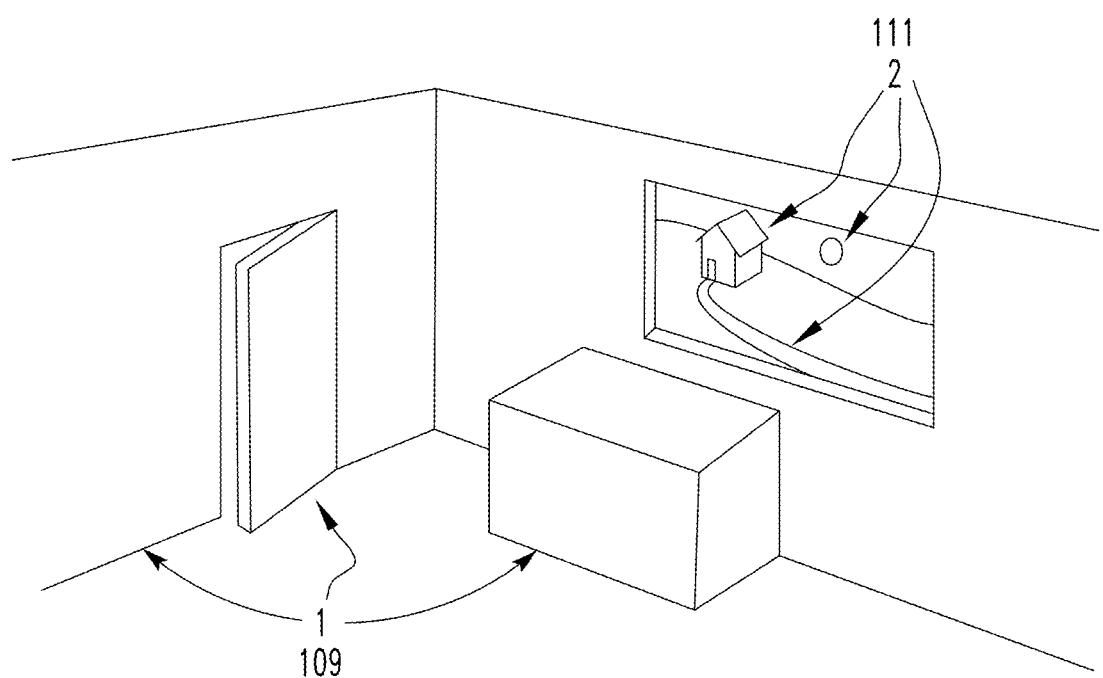
FIG. 8 is a schematic representation of another embodiment of the claimed invention involving a near field and a far field.

Referring now to the drawings wherein like reference numerals refer to similar or identical parts throughout the several views, and more specifically to FIG. 1 thereof, there is shown an apparatus 10 for viewing in a structure 12 having a first participant 14 and at least a second participant 16. The apparatus 10 comprises a first VR headset 18 to be worn by the first participant 14. The first VR headset 18 having an inertial motion unit 20, a first computer 22, and at least a first camera 24. The apparatus 10 comprises a second VR headset 26 to be worn by the second participant 16. The second VR headset 26 having an inertial motion unit 20, a second computer 28, and at least a second camera 30. Each participant sees every other participant in the structure 12 as every other participant physically appears in the structure 12 in real time in a simulated 3D rendered world displayed about them by the respective VR headset each participant is wearing. Each participant sees the simulated world from their own correct perspective in the structure 12. The simulated world includes a near field 109 and a far field 111. The first participant and the second participant interact differently with the near field 109 than the far field 111, as shown in FIG. 8. The apparatus 10 includes a marker 32 attached to the structure 12 for the first and second VR headsets 18, 26 to determine locations of the first and second participants 14, 16 wearing the first and second VR headsets 18, 26, respectively, in the structure 12 and their own correct perspective in the structure 12. The apparatus 10 includes coloring 34 on at least a portion of the structure 12 so the portion of the structure 12 with coloring 34 does not appear in the simulated world.

Each headset may have a stereo pair of forward-facing cameras 36 mounted on the VR headset to capture an image pair corresponding to a left eye and right eye of the participant, and the at least one camera is one of the forward-facing cameras 36 of the pair of forward-facing cameras 36. Each forward-facing camera of the first VR headset 18 in communication with the first computer 22 for the first computer 22 to receive the image pair from the pair of forward-facing cameras 36 of the first VR headset 18. Each forward-facing camera of the second VR headset 26 in communication with the second computer 28 for the second computer 28 to receive the image pair from the pair of forward-facing cameras 36 of the second VR headset 26.

The coloring 34 may include green screen coloring 34 on walls 38 and floor 40 of the structure 12 and on the physical objects 56 in the structure 12. The green screen coloring 34 having a brightness. The markers 32 may include a pattern 42 having a different brightness than the brightness of the green screen coloring 34 on the walls 38 and the floor 40. The pattern 42 placed on the green screen coloring 34 on the walls 38. It is not necessary to use only a green screen, but instead to use any combination of a backdrop that can easily be used to form a matte (e.g., a visibly black room that reflects infrared so it looks brighter than the people in the room to an infrared camera), together with some other method for tracking the positions and orientations of all the VR headsets to create the correct 3D point of view for each participant. Any effective technique of matting out the background from the people, as seen by the people wearing the headsets, in combination with any technique by which tracking is done so that each person also sees the VR scene from the correct perspective based on their individual position and orientation in the room may be used.

The first computer 22 executes a software program 44 stored in a memory 46 of the first VR headset 18 in communication with the first computer 22 which uses each received stereo image pair of the first VR headset 18 as a texture mapped overlay which is displayed on top of the simulated 3D rendered world. Only those portions of the stereo image pair of the first VR headset 18 which are not the color of the greenscreen are overlaid on top of the simulated 3D rendered world. Each VR headset may include an upward facing camera 48 to obtain images of a ceiling 50 of the structure 12. The second VR headset 26 and any other VR headsets operate in the same way.

The markers 32 may include QR patches 52 disposed on the ceiling 50, images of which are obtained by the upward facing camera 48 of the first VR headset 18 and used by the first computer 22 of the first VR headset 18 to determine the position of the first participant 14 in the structure 12. The second participant 16 and the second VR headset 26 in any other VR headsets of any other participants operates in the same way. The markers 32 may include a wire mesh 54 section disposed on the wall of the structure 12. The ceiling 50 may be considered by the computer to be a virtual green screen.

There may be physical objects 56 in the structure 12. Each participant may be able to interact with the simulated world and simultaneously with desired physical objects 56 in the structure 12 and able to see the desired physical objects 56 as they physically appear in real time in the structure 12 in the simulated world and simultaneously how each other participant interacts with the simulated world and the physical objects 56 in the simulated world in real time. The first VR headset 18 may have a first transmitter 58 and a first receiver 60. The second VR headset 26 may have a second transmitter 62 and a second receiver 64. The first transmitter 58 communicating with the second receiver 64 and the second transmitter 62 communicating with the first receiver 60 and each participant able to interact with the simulated world. If there are additional participants, each transmitter of each VR headset communicates with every other receiver of each VR headset. The transmitters may communicate directly with the receivers of the other VR headsets, or there may be an established network 66 with a host computer 68 having an associated transmitter 70 and receiver 72 which is in communication with all the VR headsets which receives transmissions from the VR headsets and transmits transmissions to the receivers of all of the VR headsets.

The present invention pertains to a method for a first participant 14 and at least a second participant 16 viewing in a structure 12. The method comprises the steps of the first participant 14 and the second participant 16 walking around together in a virtual world shown to the first participant 14 by a first VR headset 18 worn by the first participant 14 and shown to the second participant 16 by a second VR headset 26 worn by the second participant 16. The virtual world is an entire world around them that is simulated and displayed in each VR headset. The first participant 14 and the second participant 16 are in physical sight of each other in the structure 12 and see each other in the structure 12 in the virtual world while viewing the virtual world. There is the step of the first participant 14 and the second participant 16 seeing the virtual world from their own correct perspective in the structure 12. The simulated world includes a near field 109 and a far field 111. The first participant and the second participant interact differently with the near field 109 than the far field 111. The first VR headset 18 having an inertial motion unit 20, a first computer 22, and at least a first camera 24. The second VR headset 26 having an inertial motion unit 20, a second computer 28, and at least a second camera 30. There is a marker 32 attached to the structure 12 for the first and second VR headsets 18, 26 to determine locations of the first and second participants 14, 16 wearing the first and second VR headsets 18, 26, respectively, in the structure 12 and their own correct perspective in the structure 12. There is coloring 34 on at least a portion of the structure 12 so the portion of the structure 12 with coloring 34 does not appear in the simulated world.

There may be the step of the first participant 14 and the second participant 16 physically interacting with each other and handing each other physical objects 56. There may be the step of the first participant 14 and the second participant 16 interacting with the simulated world while they are physically interacting with each other.

User Experience

Described is a shared mixed reality (MR) experience which can be experienced within one or more physical rooms by any number of participants who are in the same physical space. All participants can freely walk around together within the space. Every participant wears a VR headset. All participants are able to see the other participants via stereo video passthrough. The visual world around all the participants can change to look like whatever is desired by the authors of the experience.

The invention allows two or more participants in the same room to each have their own unique view of a shared MR world that is completely immersive—that is, the MR world appears to the participants to be all around them, without any limitation on the visual size of perceived objects 56—while the participants are also able to see each other.

Components

As shown in FIG. 1, there are typically 6 components to the invention.

1. Optional computer network server
2. One VR headset with an Inertial Motion Unit (IMU) for each participant
3. Upward-facing camera 48 mounted on the top of the VR headset
4. Stereo pair of forward-facing cameras 36 mounted on the front of the VR headset
5. One or more QR code stickers attached to the ceiling 50 of the room
6. Green screen coloring 34 on walls 38 and floor 40 and on any physical objects 56 in the room Step by Step Internal Operation Beforehand, the position and orientation and identity of each QR code is determined, using a camera-based technique which is standard in the art. Also beforehand, all walls 38 and the floor 40 and all physical furniture or other objects 56 in the room are painted green, using a shade of green that is standard for green screen optical masking, as is standard in the art.

At the time of use, each user puts on a VR headset, and experiences, together with the other participants, a shared VR experience, which can be a software application running in the VR headset's internal computer, as is standard in the art. For content that needs to be synchronized in time between multiple users, a network 66 server sends out a periodic synchronization signal to all users, which ensures that all users experience the experience in a synchronized manner.

For each of the left eye and the right eye, respectively, of the user, the corresponding left and right image, respectively, from the pair of stereo cameras mounted on the front of the VR headset is routed to the computer within the VR headset, where it is available to be selectively delivered to the corresponding (left or right) display within the VR headset.

For all pixels of the captured image from the left or right camera and the corresponding left or right display in the VR headset (described hereafter as "that camera" and "that display"), the computer within the VR headset makes the following calculations: (1) For those pixels for which the captured pixel color is green, the color at the corresponding pixel of the VR scene is delivered to that display. (2) For all pixels from that camera which are determined to be aimed toward a location within the ceiling 50 of the room, the color at the corresponding pixel of the VR scene is delivered to that display. The determination of whether a pixel is aimed toward a location within the ceiling 50 of the room requires only a simple geometric computation which will be readily known to one practiced in the art, based only on (a) the position and orientation of the upward facing camera 48 with respect to the room, and (b) the geometric size and shape of the ceiling 50. (3) For all other pixels of that camera and that display, the image from that camera is delivered to that display. In this way, the user sees, with each eye, all other participants in the room as themselves, but everywhere else sees, with that eye, the VR experience.

In order to present the correct image to the left and right eyes of the user, the computer in the VR headset needs to know the absolute position and orientation of the VR headset. In one embodiment, the position and orientation of the VR headset is determined by sensor fusion, which is standard in the art, between the position and orientation as determined by the image captured from the upward facing camera 48 mounted on the VR headset, and the IMU within the VR headset.

Specifically, the upward facing video camera captures successive video frame images of those QR codes 52 affixed to the ceiling 50 which lie within its field of view. Alternatively (1) this camera can aim downward to see QR codes 52 on the floor 40, or (2) the video from the two forward-facing stereo cameras can be used to capture images from QR codes 52 affixed to the walls 38 of the room.

In one embodiment, the two required contrasting colors of the QR codes 52 (which are traditionally black and white) are formed from a lighter and a darker shade of green. This allows the tracking camera to utilize the identifying and positioning information from each QR codes 52, while also allowing the rendering software to use the entire room surface as a green screen material for distinguishing the human participants and other objects 56 in the foreground from the computer-generated virtual environment in the background.

Using techniques which are standard in the art, as is taught by [Marker Tracking and HMD Calibration for a Video-based Augmented Reality Conferencing System—Kato, H., IWAR—International Symposium on Mixed and Augmented Reality, 1999] the position and orientation of the headset with respect to each QR code can be determined from the visible position and orientation within the camera of that QR code. Because the absolute position and orientation of each QR code is already known, the absolute position of the VR headset is then determined as the sum of any given QR code's position and the calculated positional offset of the VR headset from that QR code. In addition, the two-dimensional tilt of the VR headset from the vertical is given from the roll and tilt readings in the IMU within the VR headset, and these values can be used via sensor fusion, as is taught by [Kelly J, Sukhatme GS. Visual-Inertial Sensor Fusion: Localization, Mapping and Sensor-to-Sensor Self-calibration. The International Journal of Robotics Research. 2011; 30(1):56-79. doi:10.1177/0278364910382802], to increase the accuracy of the computed orientation of the VR headset.

Alternative to the green screen, the computer can analyze the image in software to distinguish which pixels of each of the left and right images is a person versus which pixels are background. This can be done using, for example, the technique of "Deep Image Matting" by Ning Xu, Brian Price, Scott Cohen and Thomas Huang, incorporated by reference herein.

Exemplar Application

Two or more people using the apparatus 10 can be walking around together in a virtual museum. Each person sees the other people, although the entire world around them is simulated. Each person sees that simulated world from their own correct perspective in the room.

People can interact with each other and can hand each other physical objects 56. For example, one person can hand the other a cup of hot coffee.

In addition, people can interact with the simulated world. For example, one person can hold her hand up in front of a perceived sculpture that is in a display case in the museum. In response, the simulated sculpture rotates about its vertical axis, allowing all participants to see the sculpture from different angles. This latter feature can be implemented as follows: The computer software running on that user's VR headset detects that something (in this case, the user's hand) is blocking the line of sight to the green screen background in the direction of the sculpture. The head worn computer then rotates the virtual sculpture over time, and also sends a message to the computers on the other VR headsets, instructing them to rotate the orientation of that virtual sculpture by the same amount.

The present invention pertains to a capture module for mounting on a VR headset worn by a participant. The capture module 76 comprises an inertial motion unit 20. The capture module 76 comprises a processor in communication with the inertial motion unit 20. The capture module 76 comprises a power source in communication with the processor and the inertial motion unit 20. The capture module 76 comprises a stereo pair of forward-facing cameras 36 to capture a video stream of stereo image pairs corresponding to a left eye and right eye of the participant. Each forward-facing camera in communication with the processor for the processor to receive the image pair. The processor compresses the captured stereo image pair data and measures orientation of the VR headset at a rate of about 1000 samples per second. The capture module 76 comprises a communication interface for digital communication to the VR headset. The communication interface may also be in digital communication with a host computer 68. The host computer 68 may also be in communication with every other VR headset either directly with the VR headset or its capture module 76.

An alternative embodiment is now described with reference to FIG. 2.

Figure 2:
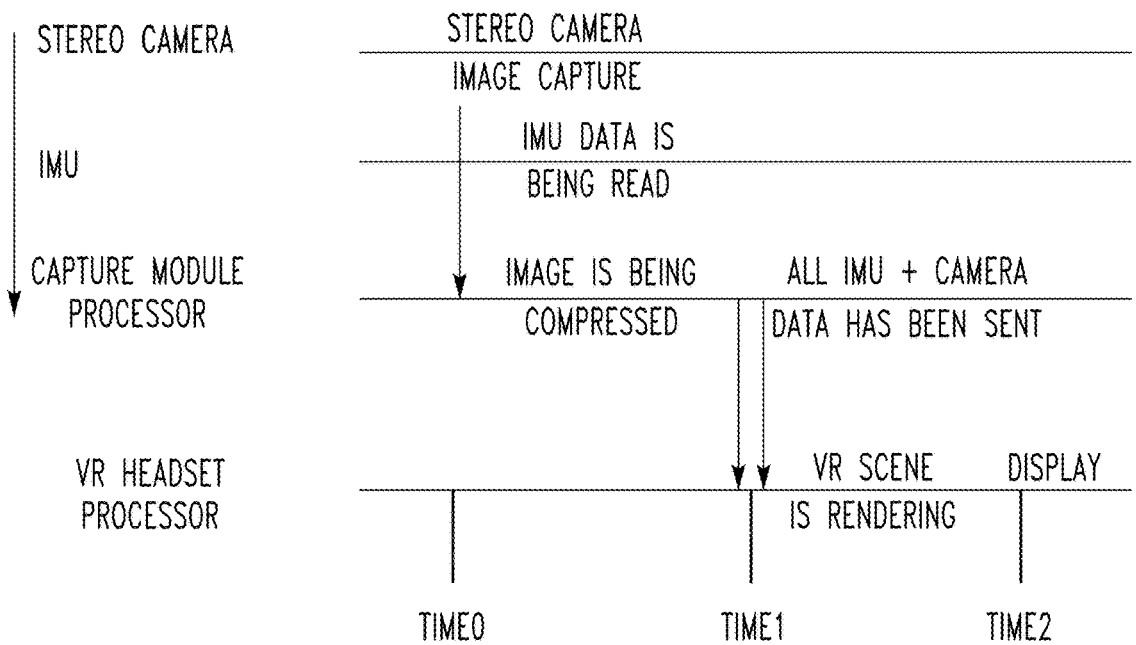
FIG. 2 is a timeline in regard to an alternative embodiment of the apparatus.

In order to create the capability shown in FIG. 2, only the following components are needed:

An untethered inside-out tracked six degrees of freedom (6DOF) virtual reality (VR) headset, such as the Oculus Quest or Pico Neo 2;

A room covered in greenscreen material. On this material is a green pattern 42 with a different brightness. The VR headset can use that pattern 42 for its inside-out position and orientation tracking [see note A];

A capture module attached to the front of the VR headset which contains the following components:
A stereo pair of video cameras
A computer processor
A source of electrical power, which can be a battery
An inertial measurement unit (IMU)
A communication interface for remote communication with one or transmitters/receivers for digital communication, which may be a wired connection to the VR headset, and/or Bluetooth, and/or WiFi The capture module has the ability to:
capture a video stream of stereo image pairs;
compress the captured stereo image pair data;
measure orientation at a rate of on the order of 1000 samples per second;
communicate with the VR headset and, if WiFi enabled, with a host computer 68

Figure 3:
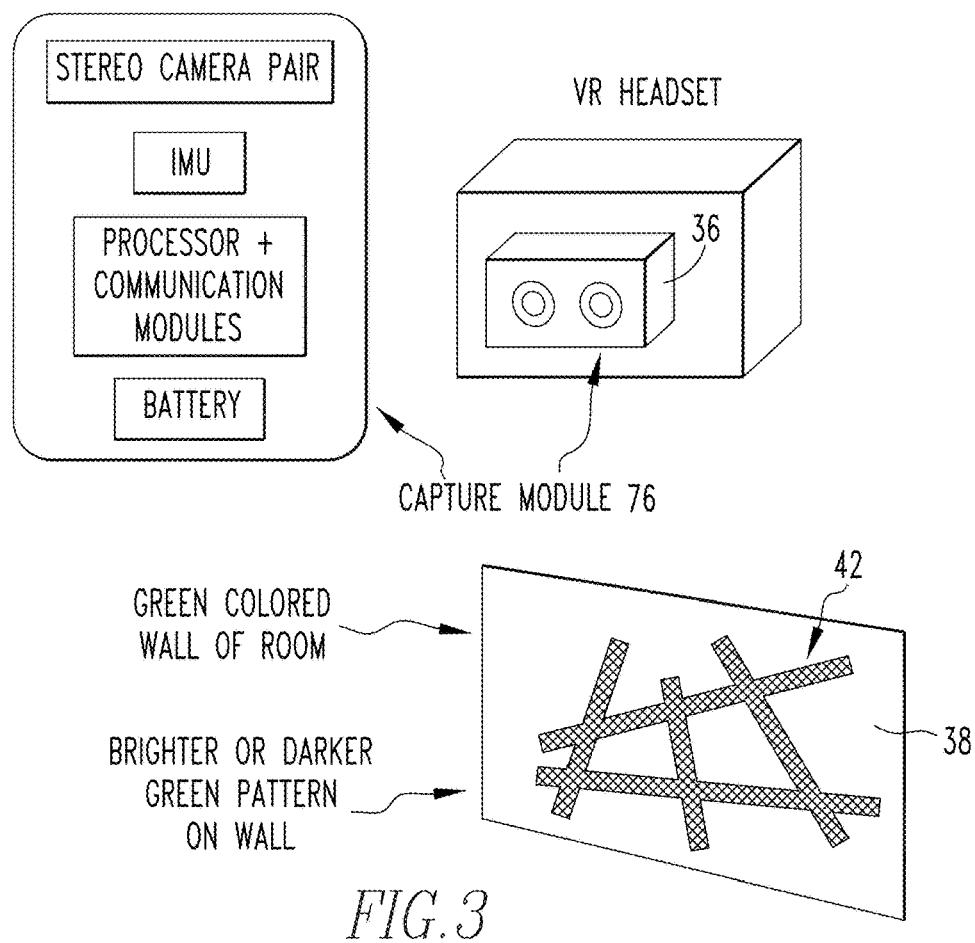
FIG. 3 shows a geometric pattern overlaid on the surfaces of a greenscreen room.

As shown in FIG. 3, a geometric pattern 42 is overlaid on the surfaces of the greenscreen room. The pattern 42 and the room are of equal hue and saturation, but differ in brightness, so that two different operations can be simultaneously supported: (1) inside-out 6DOF tracking of a VR headset and (2) greenscreen based image compositing of physical objects 56 within the room.

The primary function of the capture module is to capture and compress and transmit a video stream of stereo image pairs, and send that data to the VR headset. The VR headset's processor then uses each received stereo image pair as a texture mapped overlay which is displayed on top of the rendered 3D VR scene. Only those portions of the stereo image which are not the color of the greenscreen background are overlaid on top of the 3D VR scene.

It is not necessary for the capture module to perform 6DOF tracking. In addition to capturing, compressing and transmitting the stereo image pair to the VR headset, the capture module only needs to report rotational data from its onboard IMU, which indicates how the user is turning her head.

This IMU data gathered by the capture module, in conjunction with knowledge of the time delay between capture of a given stereo image pair and display on the VR headset that incorporates that stereo image pair, allows the VR headset's processor to compute an accurate x,y shift in the texture mapping of the stereo image onto the VR scene, so that each frame of the captured sequence of stereo image pairs appears visually steady to the user, rather than shaking, shifting or jittering in an undesirable way as the user rotates her head.

In order to property compute the x,y shift to be used by the VR headset when texture mapping each captured stereo image pair onto the stereo VR scene that is displayed to the user, the VR headset's processor needs to know the amount of time elapsed from (1) the time the stereo image pair was captured by the capture module to (2) the time when the final rendered VR scene is displayed on the VR headset.

This elapsed time can be computed by maintaining a low latency connection between the capture module and the VR headset's processor. Examples of enablement of such a low latency connection include (1) a wired connection, (2) a Bluetooth connection with a very small or no buffer and (3) a stream of UDP packets via a local Web server.

At the moment when a stereo image pair is captured by the capture module, the capture module transmits a digital signal to the VR headset's processor via this low latency connection, to indicate that the capture has occurred. The VR headset processor uses its internal clock to record the time TIME0 when this signal was received. Meanwhile, as soon as the capture module has transmitted the aforementioned signal, the capture module begins to transmit the stereo image pair data to the VR headset's processor.

Subsequently, as soon as the VR headset's processor has received and uncompressed the entire stereo image pair (at TIME1 on the internal clock of the VR headset's processor), the VR headset's processor can then proceed to render the animation frame in the VR scene which incorporates the received stereo image pair as a texture.

The VR headset's processor also has knowledge, from the time required to render previous animation frames, of the amount of time DT required to render a single animation frame, from onset of rendering computation to final display of the animation frame. The VR headset's processor can therefore predict the time of final display TIME2=TIME1+DT.

The capture module continually gathers rotation data from its on-board IMU. This data corresponds to the rotation of the head of the person wearing the VR headset, which the IMU measures many times per second. Typically, the sampling rate of an IMU is between 1000 and 2000 samples per second. The capture module transmits this stream of rotation data to the VR headset's processor.

Using techniques that are standard in the art, such as [1], the IMU rotation data received from the capture module can be used by the VR headset's processor to accurately predict how much the user's head will have rotated from the moment of initial image capture TIME0 to the moment of final VR scene display TIME2. This rotation prediction is used by the VR headset's processor to compute an x,y shift in the texture that the VR headset incorporates into its final VR scene display.

The resulting x image shift is based on the predicted yaw component of head rotation, and the resulting y image shift is based on the predicted pitch component of head rotation. In particular, if the predicted yaw component of head angular rotation is $\theta$, and the predicted pitch component of head angular rotation is $\varphi$, then the x shift needs to sufficient to create a visible yaw component of angular shift of the texture within the final displayed scene of $-\theta$, and the y shift needs to be sufficient to create a visible pitch component of angular shift of the texture within the final displayed scene of $-\varphi$.

In an alternate embodiment, the data stream produced by the IMU on the capture module is used by the processor of the capture module, as in [1], to compute the angular shift in yaw and pitch, $\theta 1$ and $\varphi 1$, respectively, between times TIME0 and TIME1. These two values are then transmitted at time TIME1 from the capture module to the VR headset's processor. The total angular shift in yaw and pitch between TIME0 and TIME2 is then computed by the VR headset's processor as $C*\theta 1$ and $C*\varphi 1$, where:

$$C=(TIME2-TIME0)/(TIME1-TIME0)$$

In one embodiment, the capabilities described for the capture module are all contained in the VR headset itself. In that embodiment, the capture module is not required.

Also, the time required in the VR headset to image receive and uncompress the stereo pair data for any animation frame can optionally be overlapped with the time required to render the previous animation frame. See note B for details.

EXAMPLE USE CASE

Two people walk into a room that is covered with a green colored material, such as fabric, or painted with green colored paint. On the walls 38 of the room is a crisscrossed stripe pattern 42 that is a brighter shade of the same green color. Both people are wearing inside-out tracking VR headsets. Affixed to the front faceplate of each VR headset is a capture module that contains a forward-facing pair of stereo cameras. Inside each capture module is an IMU and a processor. Each capture module is plugged into a USB-C port of the VR headset to which it is affixed.

As the first person looks around, he can see, within his VR headset, the second person in the room. Everywhere else that he looks, he sees an imaginary computer-generated world. As he walks around the room, the computer-generated world changes to match his point of view, just as it would if he were in a real environment. Because the walls 38 of the room are covered by a crisscrossed stripe pattern 42, his inside-out tracking VR headset is able to modify its view into the room so as to maintain a correct and consistent point of view as he moves and turns his head.

The reason this works is that the standard optical tracking algorithm employed by inside-out tracking VR headsets relies only on differences in brightness along edges that bound regions of differing brightness and at intersections between those edges [2]. Therefore, the hue and saturation of the patterned wall is not relevant—only the brightness varying pattern 42 on the wall is relevant.

The view by the first person of the second person is derived from the captured sequence of stereo camera images that originate in the pair of stereo cameras in his capture module. The capture module is continually sending a compressed video stream of the images from the stereo pair to his VR headset's processor. In each of the compressed images that the capture module transmits to the VR headset's processor, pixels are marked as transparent if they correspond to locations within the room that are either the shade of green corresponding to the greenscreen surface or to the shade of green of the crisscrossed stripe pattern 42.

The VR headset's processor uncompresses the received images and uses them as a texture map, which it overlays on top of the 3D virtual reality scene that it is rendering.

Rendering to the left eye proceeds as follows: For every pixel in the received left image from the stereo camera pair that the capture module had marked as transparent, the corresponding pixel from the left image of the rendered 3D scene is displayed, whereas for every pixel in the left image that had not been marked as transparent, the corresponding pixel from the left image from the stereo camera is displayed. In general, given any partially transparent pixel with an opacity of $\alpha$, on a linear scale of opacity where $\alpha=0$ indicates completely transparent and $\alpha=1$ indicates completely opaque, the pixel is rendered as follows:

(1−α)*(color at this pixel of 3D scene)+α*(color at this pixel from camera)

The same procedure is followed for, respectively, the received right image from the stereo camera pair and the corresponding pixel from the right image of the rendered 3D scene.

This procedure has the effect of visually replacing the surfaces of the greenscreen room—but not of the other person—by the 3D computer generated scene. The visual effect, as seen by the first person, is as though the second person is standing and moving around in an imaginary computer-generated world.

If there were no process of angular correction, then any temporal delay between the time the stereo images were captured by the capture module and the time when the 3D scene is ultimately displayed on the VR headset would cause the image of the second person to be positioned incorrectly each time the first person turns his head rapidly. This is because the temporal delay causes the first person to see the second person, with respect to the first person's head orientation, where the second person had been located slightly in the past. This unwanted artifact would be visually disturbing to the first person and would detract from his experience.

This artifact is avoided because the capture module is also sending timing and angular shift data to the VR headset's processor, based on the internal clock of the capture module's processor combined with rotational data gathered by the IMU in the capture module. The VR headset's processor is able to use this information to correct for any errors in the first person's view of the position of the second person due to rapid head rotations on the part of the first person, by performing a compensating positional shift in the overlaid texture of the received stereo pair images within the rendered virtual reality scene.

Step by Step Internal Operation

At TIME0:
    capture module captures stereo image pair
    capture module takes first angular reading yaw0, pitch0 from its IMU Between TIME0 and TIME1:
    capture module compresses stereo image pair
    capture module sends compressed stereo image pair data to Headset
        using high bandwidth method, such as WiFi UDP packets At TIME1:
    capture module takes second angular reading yaw1,pitch1 from its IMU
    capture module sends [TIME1−TIME0, yaw1−yaw0, pitch1−pitch0] to Headset
        using low latency method such as hardwired, Bluetooth, or local WiFi
    Headset uses estimate of rendering time DT to compute time TIME2 of final display:

TIME2=TIME1+DT

Between TIME1 and TIME2:
    Headset uncompresses stereo image pair, preparing it for use as a texture overlay
    Headset estimates angular drift as:

$[-\theta, -\varphi] = [C*(yaw1-yaw0), C*(pitch1-pitch0)]$ where $C=(TIME2-TIME0)/(TIME1-TIME0)$
    Headset renders VR scene:
        Stereo pair is used as an overlay texture, with green regions transparent
        Overlay texture is [x,y] shifted to effect a visual angular shift of $[-\theta, -\varphi]$ At TIME2:
    Headset user sees final rendered VR scene with stereo pair image texture overlay Notes

[A] In order to allow the VR headset to perform 6DOF inside out tracking within the greenscreen room, the greenscreen surface can be visually overlaid by a geometric pattern 42. In one embodiment, this pattern 42 can be a set of crisscrossing green stripes, which in one embodiment can be implemented by green colored adhesive tape. The stripes have the same hue and saturation as the greenscreen surface, but a different brightness. The overlaid pattern 42 can be either brighter or darker than the greenscreen surface.

[B] The sequence TIME0→TIME1→TIME2 can be overlapped between successive animation frames. As soon as the capture module has sent all video data for frame n, it can immediately proceed to capture, compress and transmit the stereo image pair for the next frame, at TIME0 for frame n+1. This overlap allows more time for both (1) data uncompression and rendering of the 3D scene on the VR headset and (2) compression and transmission of the stereo pair image data from the capture module to the VR headset. This overlap requires the processor on the VR headset to use multithreading to simultaneously (1) render the image for frame n while (2) receiving and uncompressing the stereo image pair for frame n+1.

Figure 4:
FIG. 4 shows a black mesh held up in front of a green screen.
Figure 5:
FIG. 5 shows a black mesh held up but not in front of a green screen.

FIG. 4 shows a black mesh 54 held up in front of a green screen. The mesh 54 alters only brightness, not hue or saturation of surfaces to support simultaneous green screen matting and inside-out VR tracking. When a standard green screen algorithm is run to replace the green background by another image, the mesh 54 does not interfere with the algorithm. Specifically, the result is the same in the places where the mesh 54 is in front of the green screen as it is where the mesh 54 is not in front of the green screen, as shown in FIG. 5. The mesh 54 needs to be black because any other color would modify the hue, and therefore the greenscreen algorithm would no longer work. There is no minimum box size limit. The maximum box size does not seem to matter for the green screen algorithm, because the algorithm seems to simply ignore the fine threads of the mesh 54, and therefore classifies the entire mesh 54 as background. The black mesh 54 may be of the type available for a window screen or a door screen which allows air and sun light to pass through but prevents most bugs from passing through.

At the same time, a camera which detects only brightness, such as the inside-out tracking gray scale cameras used on a VR headset such as the Oculus Quest, will clearly detect an edge on the border of the mesh 54. When looking for edges, the inside-out tracking algorithm does not recognize isolated black lines, but rather straight-line boundaries between a darker region and a lighter region. Therefore, the darker shade of the region formed by the interior of the mesh 54 is an integral part of the feature that the algorithm relies upon to detect edges.

When strips of black mesh 54 are placed over a green screen surface, the resulting edges in brightness can be used by an inside-out tracked VR headset, such as the Oculus Quest, to track the position and orientation of the VR headset, even when the tracking is done in a green screen room. The boundary formed by the sudden change in brightness at the edge of the overall mesh 54 is what is recognized by the tracking algorithms, not the individual columns and rows that make up the mesh 54.

In one enablement of the invention, long strips of black mesh 54 material, which in one embodiment can be made of 10" wide flexible plastic, are laid over a plain green screen surface. This approach has the advantage that it is very easy to set up for a large tracking area, without the need to print any pattern 42 directly onto the green screen surface itself.

Figure 6:
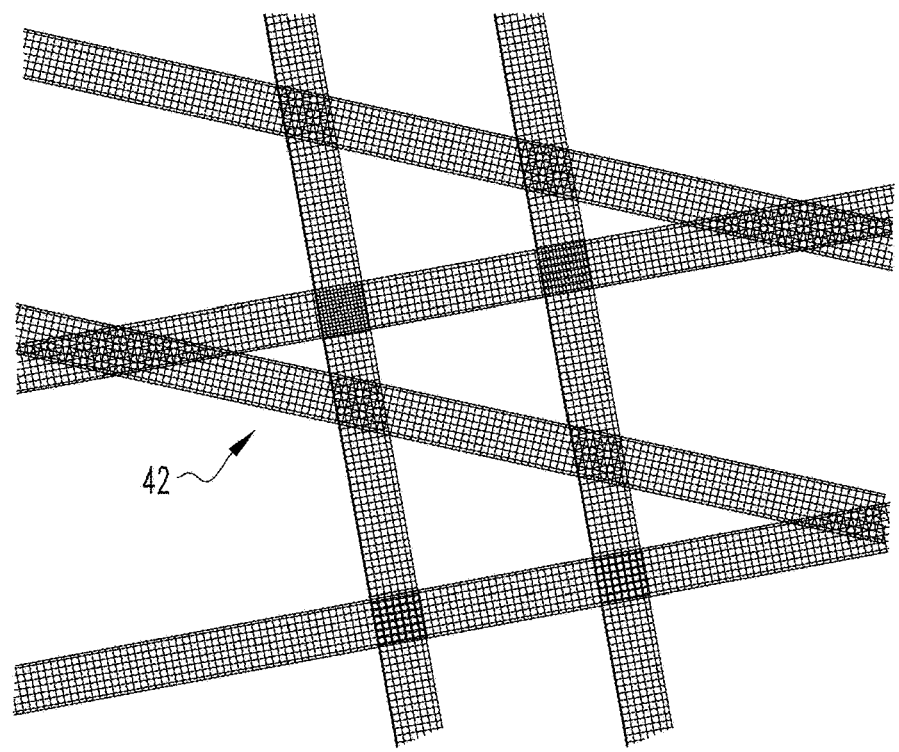
FIG. 6 shows one strip criss-crossed on top of another to form a pattern.

Strips can be taped to the green screen surface at both ends, or affixed to the surface with a light adhesive, and positioned so that one strip criss-crosses on top of another, as shown in FIG. 6. Wherever one strip crosses over another the surface remains transparent enough so that the entire surface continues to function as a green screen.

The mesh 54 is chosen so that individual squares of the mesh 54 are sufficiently small that they do not register as features in the green screen algorithm used by the computer on each user's VR headset to distinguish foreground from background.

This approach to adding a trackable pattern 42 to the green screen surface enables the VR room to be set up very easily, rapidly and inexpensively, as compared with other approaches.

In regard to the pattern 42 itself, inside tracking for VR generally works via the SIFT (Scale-invariant feature transform) algorithm. SIFT is a very well-known algorithm in the field, which was developed many years ago. For more detail, see https://en.wikipedia.org/wiki/Scale-invariant_feature-_transform. In order for SIFT to function, the pattern 42 seen by the camera within the VR headset needs to have certain properties.

In particular, SIFT works by tracking points. It finds those points by looking at places where edges meet. So, at each captured camera frame, SIFT begins by finding edges in the image. Then it looks at where those edges meet, in order to identify points that represent the same 3D location in space from frame to frame. Given enough such points over a sequence of captured frames, the SIFT algorithm is able to recover the 4×4 matrix that represents the position and orientation of the camera as the camera moves through the scene over time. Given the above, what is important about the pattern 42 that is placed upon the green screen walls 38 is that it contains straight line edges, and that those edges intersect so as to create trackable feature points.

As for how the location information of the participant is merged into the VR, the participant is physically located in the room. Also, in parallel to that, the camera within the VR headset is continually tracking the position and orientation of the user's head within the physical room, and is using that information to render the virtual scene from the position of the user's head. Therefore, the position of the participant's head in the physical world is always the same as the position of the participant's head in the virtual world.

When the above is combined with the fact that the participant sees the virtual world only at pixels where the patterned green screen room is visible (that is, where it is not blocked by any other participants), the result is that the participant always sees the virtual world with a position and orientation that matches the physical positions and orientations of all participants in the room.

It can be impractical to cover an entire ceiling 50 with greenscreen material. To avoid the need for covering the ceiling 50 with greenscreen material, a modification is described to the foreground/background matting algorithm that simulates a greenscreen ceiling 50, even if no greenscreen ceiling 50 is present.

Figure 7:
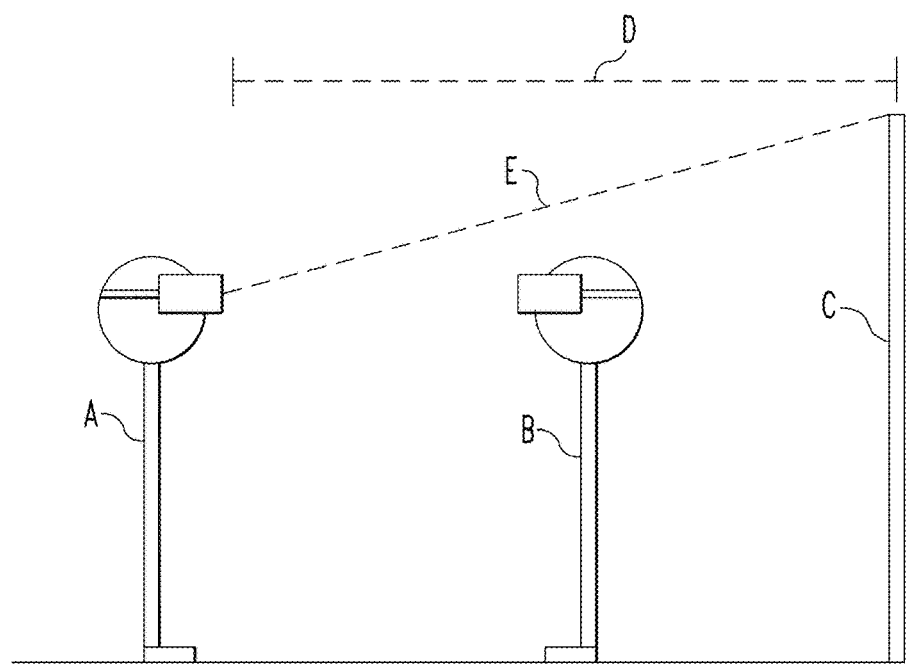
FIG. 7 shows a cutoff angle above the heads of other participants in a structure in regard to a virtual green screen ceiling.

When person a wearing a VR headset looks at another person b in the same room, one or more greenscreen walls 38 c will be visible to person a behind their view of person b. Because the geometry of the room is known, each such wall will have a known height h. Because the location of person a within the room is also known, there is a known distance d from the VR headset of person a to the location of wall c, in the direction perpendicular to the wall. From this, the angle arctan(h/d) can be calculated in the direction facing that wall. The foreground/background matting algorithm is then modified so that all pixels in the image shown to person a which are above this angle are treated as background, even if they are not green in color. This same procedure is applied to every wall that is visible to person a. In this way, the ceiling 50 is treated as background, even if it is not colored green. As shown in FIG. 7, this cutoff angle will be above the heads of other people in the room, so this modification to the matting algorithm will not render those people as part of the background.

This method also has the advantage that it is consistent with putting QR codes 52 on the ceiling 50 to be used in conjunction with one or more upward-facing cameras 48 mounted on the VR headset for inside-out tracking based on ceiling 50 markers.

In fact, this technique of using just the vertical angle from the VR headset to the ceiling 50 to declare that region as background—while not requiring any green surface to be physically present on the ceiling 50—confers the advantage that the ceiling 50 remains completely free to be used as a location for physical tracking markers. A set of QR codes 52 on the ceiling 50 is, in fact, one such example of the use of physical tracking markers on the ceiling 50. The upward-facing camera 48 is still able to see the ceiling 50, and therefore can see any QR codes 52 on the ceiling 50. The virtual green screen in the direction of the ceiling 50 is just a software post-proces sing step.

A business model is now described utilizing the hardware and methods described herein. The business model involves participants experiencing location based entertainment (LBE) in which participants wearing 6DOF virtual reality (VR) headsets (VR LBE) can all see each other via pass-through video while sharing a computer rendered virtual world together within a green screen room, and where the color of the green screen room is used within the computer of each VR headset to create a foreground/background matted image at each moment in time for each participant, such that for each eye of each participant, the foreground image consists of the other participants in the room, and the background image consists of the rendered 3D scene, which is visible to each participant wherever the green screen material is visible to that eye.

The described business model includes an owner franchising to multiple clients. Each client is a commercial LBE vendor to whom are licensed franchises (this client is referred to as the "LBE"). The customers for each LBE pay an admission fee to enter an LBE space to participate in a shared VR experience. Content is continually replenished by the owner, so that each LBE can periodically provide new content for its customers.

Each VR headset connects to owner's remote server 68 through a communication network 66. The owner provides the LBE with access to creator assets via a web portal. To select content, an operator working for the LBE can select content from any computer, tablet or smartphone by accessing the remote owner server as a URL via a Web based interface running on a Web browser, or by running a secure application program that the owner provides which serves the same purpose as a Web based interface.

For this purpose, the owner maintains a publishing website. Creators use this site to upload their content to the owner's server 68 through the network 66. LBE venues license this content from the owner. The owner pays creators a percentage of the funds that owner receives from LBE venues. In this way, owner controls the marketplace.

The owner does not sell VR headsets. Instead, the owner leases headsets that the owner owns to the client LBEs. Each client LBE pays the owner a periodic maintenance fee, which in one embodiment can be paid monthly, and in another embodiment can be paid annually.

At the LBE location, each VR headset is run in "enterprise mode". This means that the LBE's customer can only run the content that has been chosen for them by the LBE. All content is downloaded directly from the owner's Cloud server 68 to each individual VR headset through a network 66. There is no need for the LBE to maintain their own computer server to communicate with the owner's VR headsets.

When a VR headset malfunctions, the LBE operator simply returns it to the owner by mail in a postage-prepaid box that the owner provides. In parallel, the owner ships a replacement VR headset to the LBE.

The owner can also choose to license this business model to bespoke collections of LBEs, such as Universal Studios theme parks.

In another embodiment, FIG. 8 shows two distinct components of the participant's view of the scene. Component 1 is the near field 109, consisting of nearby objects in the room, which in this case are the desk and the walls and door of the room. Component 2 is the far field 111, consisting of objects that are sufficiently far away that they do not appear to shift in position when the participant's head moves, which in this case are the far away objects seen through the window: the house, the sun and the road to the house.

Motivation

A number of compelling real-world visual experiences can effectively be broken down into three distinct visual components: (1) the people and any other living beings that you see in your immediate vicinity, (2) a physical background that is relatively near, such as the room in which you are located, and (3) a large vista that is far away, such as the view outside of a window.

When developing a simulation of such experiences to be shared by multiple co-located participants, inherent differences between these three components can be exploited, by the technique described herein, to implement the experience in a way that requires only low end and therefore inexpensive MR (mixed reality) equipment, rather than relying on high end MR equipment.

The ability to provide such shared experiences using only low-end MR equipment is advantageous for several reasons, including: [a] high-end MR equipment is much more expensive than low end equipment, [b] the equipment required for wearable high end MR can be large and heavy, and therefore can inhibit the mobility and comfort of its user, [c] if rendering is done remotely and sent to the MR headset via a wired connection, then the mobility of its user is severely limited, and [d] if rendering is done remotely and sent to the MR headset via a wireless connection, then there can be only a small number of participants in the shared experience, due to the limitations of wireless bandwidth.

One example of such a compelling real-world experience is a vacation at an ocean-front resort. When you look at the view from your balcony onto an ocean-front beach, you see (1) the people on the balcony with you, (2) the balcony itself, and (3) the beach scene that is far away.

To re-create this experience for co-located multi-participant MR, it is necessary to (1) literally show the people in the room, for example by using the video pass-through technique described herein, as well as (2) a visual simulation of the porch that properly varies with the six degrees of freedom of both position and orientation (6DOF) of each participant, as tracked by their individual MR headset, and (3) a simulation of the time-varying view beyond the balcony. (1) and (2) are in the near field 109, and (3) is in the far field 111.

(3) is too far away for there to be any discernible stereo-disparity based difference in the images seen by the participant's left eye and the participant's right eye, respectively. Therefore, at any given moment in time for any given participant, the same image of this component can be delivered by that participant's MR headset to both the left and right eye of the participant. Also, because the vista is very far away, lateral movement of the participant's head has no perceptible visual effect. Therefore, only the tracked orientation (3DOF) of the MR headset is relevant.

In most such situations where multiple people together in a room are looking out upon a vista, the room in which they are situated generally has a relatively simple geometry. Also, animation of any non-human objects in that room can generally be described by simple rigid body movements, one example being the movement of a door that is swinging open or closed. Visual rendering of the room itself can therefore generally be computed at high frame rates even on low-end VR headsets.

In contrast, a faraway vista is, in general, highly visually complex, and can contain shapes and movements, such as the crashing of ocean waves upon a beach, that are difficult or impossible to effectively simulate at the high frame rates required by MR.

Yet because the MR headset needs to display this far away vista only in 3DOF, the time-varying visual representation of the vista can be visually rendered as a video stream of spherical images. This stream can be generated in various ways, including being separately captured beforehand by a spherical camera, or being pre-computed as computer graphic imagery (CGI), or being created by some combination of both spherical camera capture and CGI.

Therefore, the process of viewing the resulting spherical video stream on a MR headset consists only of selecting the currently visible sub-window into each successive frame of the video, based upon the current orientation of the user's head, as tracked by their MR headset. Rendering such a sub-window is an operation that can be performed at high frame rates even on low-end MR headsets.

Finally, component (1) can be combined with components (2) and (3) within the MR headset using the technique described above.

Technical Description

The technique described above makes use of video-passthrough to implement multi-participant MR in a patterned green-screen room, as described above. This technique can be used with low end virtual reality (VR) headsets, such as the Oculus Quest. This technique effectively promotes those headsets from VR headsets to MR headsets.

When using the technique of above to serve a large number of participants who are all in the same room and are all able to move around in full 6DOF while wearing VR headsets, it is not feasible for every participant to use a high-end headset connected to an external computer, because there is simply not enough wireless bandwidth available to send a different 6DOF time-varying stereo scene to each person's headset.

For this reason, stand-alone VR headsets that employ inside-out tracking, such as the Oculus Quest, are generally used in situations involving a large number of co-located mobile participants. These stand-alone VR headsets generally utilize the Android operating system and the low-end SnapDragon graphics co-processor. The computational limitations of such VR platforms limit the complexity of VR scenes that they can correctly render in response to their user's continually changing 6DOF head position and orientation.

However, it is feasible, using such platforms, to render relatively simple 3D scenes—such as the interior of a physical room—to mobile participants whose viewpoints are varying in 6DOF, by using relatively simple polygonal models that have texture maps which provide the needed detail. Because the descriptions of such room interiors are relatively simple, the data required to render them can fit within the local storage of the VR headset itself, and therefore no connection with an external storage system or network is required.

It is also feasible to either stream or else locally store on each headset a pre-computed 3DOF spherical video, which can represent animated or real scenes of great complexity. The user can look toward various directions into this animated scene just by turning her head. Because the content is meant to represent objects that are far away, it is not necessary to account for the user's position within the room in order to show this part of the content.

This invention combines these two capabilities, showing nearby objects in full 6DOF. Simultaneously highly complex background scenes that are meant to represent animated objects and scenes at a large distance from the viewer are shown by streaming that content as spherical video.

The streaming background can be provided to the headset either over wireless internet, such as Wifi, or from a local storage medium, such as a solid-state storage drive that is physically connected to the VR headset by wire.

Whether streaming wirelessly or streaming from a physically attached device, the same spherical video content can be simultaneously provided to all users, so that all users perceive the same consistent time-varying sequence of background imagery.

Notes

Near-field 6DOF consists of:
real-time textured 3D graphics
   Can be implemented as a 3D polygonal scene with mapped textures
Far-field 3DOF consist of:
Streaming panorama
   Can be implemented as a compressed/transmitted/decompressed video stream
   Can be from a storage device physically connected to the VR headset
   Alternately, can be streamed to all headsets in the room over Wifi
The far-field is "behind" the near-field
The VR headset performs the required matting using standard CGI techniques.
This technique works on an inexpensive stand-alone 6DOF VR headset.
In particular, it works with the patterned greenscreen tracking technique so different participants in the experience can see each other.

A small external storage module can be attached via wire for longer spherical videos. This module can also house the battery power Some Example Use Cases People are all sitting on a virtual porch looking out at ocean waves
People all travel together in a virtual flying saucer to visit different worlds Technical Description of Separation of Near Field 109 and Far Field 111

This section covers the following two topics:
Describing the distinction from a participant's perspective between the visual near field 109 and the visual far field 111;
Providing a technical description of how this invention implements visualization of the near field 109, versus how this invention implements visualization of the far field 111.

The farthest distance at which a human can perceive distance due to binocular disparity between their left and right eye (a distance generally known as "stereo infinity") is approximately 200 meters. Beyond this distance, the left eye and the right eye, for all practical purposes, perceive the same image [ref: "3D TV and 3D Cinema: Tools and Processes for Creative Stereoscopy" by Bernard Mendiburu, SBN-13: 978-0240814612, incorporated by reference herein].

Also, far away objects that are nearer to a viewer than 200 meters can be effectively treated as beyond stereo infinity if there are other objects that are much nearer to the viewer than those objects (such as a nearby windowsill or other people or furniture in the same room with us), because the binocular disparity in the viewer's perception of the far away object is very small compared with the binocular disparity in the viewer's perception of the nearer object. For example, when looking out of a window at a tree which is 50 meters away and another tree seen next to it which is 200 meters away, the viewer notices mainly that both trees are much further away than the window sill, not that one tree is nearer to the viewer than the other. The viewer perceptually classifies both trees as "far away".

The visual world around a viewer can therefore be divided into two parts. Those objects in the viewer's visual field, such as the physical room the viewer is in and the other people in that room, are part of the viewer's visual "near field 109". The viewer can approximate his or her distance from others via binocular disparity. In contrast, what the viewer perceives when the viewer looks out of the window of a skyscraper, or when the viewer looks at a distant tree or mountain or up at the clouds in the sky, is part of the viewer's visual "far field 111". Perceptually, these objects are effectively at infinity. That is, a simple definition between near field 109 and far field 111 is: the near field 109 is the interior of the structure the viewer is in and anything within the interior; the far field 111 is anything beyond the interior of the structure. For example, a structure that is a room having a window would have anything within the room, the walls of the room and the window of the room being in the near field 109 and displayed accordingly in the virtual world as the near field 109, and anything that is seen through the window from the interior of the room which appears outside the room being in the far field 111 and displayed accordingly in the virtual world as the far field 111. Examples of objects appearing through the window could be trees, buildings, air planes, cars, roads, lawns and people on the lawns or roads. Similarly, from a porch or deck looking out onto a shoreline, anything on or within the deck or porch is in the near field 109 and anything not on or withing the deck or porch is in the far field 111. Anything within the structure may be in the near field, and anything outside of the structure may be in the far field.

For the purposes of this invention, time varying phenomena in the visual far field 111 can be treated as a single time-varying spherical image. Participants cannot interact with the far field 111, and individual objects in the far field 111 do not need to be individually rendered. Computation of the far field 111 consists only of two steps: (1) streaming in a sequence of spherical images over time, and (2) at any animation frame, selecting the angular subregion of the far field 111 that is currently visible to each eye of the participant, based on the current orientation of the participation's head, as measured by the participant's VR headset.

Notably, the user cannot interact with the far field 111 in the same way that they can interact with individual physical objects or simulations of physical objects in their near field 109.

Rendering of objects in the visual near field 109 requires a different computational path. To render the near field 109, both the participant's head position and head orientation need to be continually tracked, to determine the current 3D view of objects within the room from each of the participant's two eyes.

Treating the near field 109 and the far field 111 separately confers the key advantage that because there is no interaction with the participant and the far field 111, only a constant computational cost is required for objects that can be classified as far field 111 objects. This computational requirement is independent of the visual complexity of the far field 111 scene.

When rendering a scene that contains both near field 109 and far field 111 components, the two components can be visually merged with one another by making use of the fact that all objects in the far field 111 are further away than all objects in the near field 109, and therefore will be visually obscured by near field 109 objects wherever both objects are in the same visual direction.

Therefore, when using a computer graphics algorithm to render the scene for each eye in the VR headset, a distance of positive infinity can be assigned as the depth of the rendered far field 111. This will result in the depth buffer in the graphics engine of the VR headset always displaying the near field 109 object rather than the far field 111 object in those directions where a near field 109 object is present.

For example, if there is an open window in a scene of the view from the window of a skyscraper, the walls of the simulated room are part of the near field 109, and will therefore always obscure the view of the cityscape beyond, which is part of the far field 111. In contrast, there is no near field 109 object where the window is open. For those regions of the image the participant will perceive the cityscape in the far field 111.

References, all of which are incorporated by reference herein

[1] Manon Kok, Jeroen D. Hol and Thomas B. Schon (2017), "Using Inertial Sensors for Position and Orientation Estimation", Foundations and Trends in Signal Processing: Vol. 11: No. 1-2, pp 1-153. http://dx.doi.org/10.1561/2000000094.

[2] C. Choi and H. I. Christensen, "Real-time 3D model-based tracking using edge and keypoint features for robotic manipulation," 2010 IEEE International Conference on Robotics and Automation, 2010, pp. 4048-4055, doi: 10.1109/ROBOT.2010.5509171.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for viewing in a structure having a first participant and at least a second participant comprising: a first virtual reality headset to be worn by the first participant, the first virtual reality headset having an inertial motion unit, a first computer, and at least a first camera; a second virtual reality headset to be worn by the second participant, the second virtual reality headset having an inertial motion unit, a second computer, and at least a second camera, each participant sees every other participant in the structure as every other participant physically appears in the structure in real time in a simulated world displayed about them by the respective virtual reality headset each participant is wearing, each participant sees the simulated world from their own correct perspective in the structure, the simulated world includes a near field and a far field, the first participant and the second participant interact differently with the near field than the far field; a marker attached to the structure for the first and second virtual reality headsets to determine locations of the first and second participants wearing the first and second virtual reality headsets, respectively, in the structure and their own correct perspective in the structure; and coloring on at least a portion of the structure so the portion of the structure with coloring does not appear in the simulated world.

2. The apparatus of claim 1 wherein the first computer and the second computer do not take into account the first participant's position and the second participant's position, respectively, within the structure in order to show the far field in the simulated world for the first participant and the second participant, respectively.

3. The apparatus of claim 2 wherein the far field in the simulated world varies only in 3DOF with respect to each participant as tracked by each participant's head set, and the near field in the simulated world varies with six degrees of freedom of both position and orientation (6DOF) with respect to each participant as tracked by each participant's head set.

4. The apparatus of claim 3 wherein the far field in the simulated world is visually rendered as a video stream of spherical images.

5. The apparatus of claim 4 including a stereo pair of forward-facing cameras mounted on each virtual reality headset to capture an image pair of the near field corresponding to a left eye and right eye of the participant, and the at least one camera is one of the forward-facing cameras of the pair of forward-facing cameras, each forward-facing camera of the first virtual reality headset in communication with the first computer for the first computer to receive the image pair from the pair of forward-facing cameras of the first virtual reality headset, each forward-facing camera of the second virtual reality headset in communication with the second computer for the second computer to receive the image pair of the near field from the pair of forward-facing cameras of the second virtual reality headset, an image pair of the far field regarding the left eye and right eye of the first virtual reality headset are identical, and an image pair of the far field regarding the left eye and right eye of the second virtual reality headset are identical, but the image pair of the far field of the first virtual reality headset and the image pair of the second virtual reality headset are different.

6. The apparatus of claim 5 wherein the coloring includes green screen coloring on walls and floor of the structure, the green screen coloring having a brightness.

7. The apparatus of claim 6 wherein the markers include a pattern having a different brightness than the brightness of the green screen coloring on the walls and the floor, the pattern placed on the green screen coloring on the walls.

8. The apparatus of claim 7 wherein the first computer executes a software program stored in a memory of the first virtual reality headset in communication with the first computer which uses each received stereo image pair of the first virtual reality headset as a texture mapped overlay which is displayed on top of the simulated 3D rendered world, only those portions of the stereo image pair of the first virtual reality headset which are not the color of the green screen are overlaid on top of the simulated 3D rendered world.

9. The apparatus of claim 8 wherein each virtual reality headset includes an upward facing camera to obtain images of a ceiling of the structure.

10. The apparatus of claim 9 wherein the markers include QR patches disposed on the ceiling, images of which are obtained by the upward facing camera of the first virtual reality headset and used by the first computer of the first virtual reality headset to determine the position of the first participant in the structure.

11. The apparatus of claim 10 wherein the markers include a wire mesh section disposed on the wall of the structure.

12. The apparatus of claim 11 wherein the ceiling the considered by the computer to be a virtual green screen.

13. The apparatus of claim 12 including physical objects disposed in the structure, each participant is able to interact with the simulated world and simultaneously with desired physical objects in the structure and able to see the desired physical objects as they physically appear in real time in the structure in the simulated world and simultaneously how each other participant interacts with the simulated world and the physical objects in the simulated world in real time, the physical objects disposed in the structure in the near field.

14. The apparatus of claim 13 wherein the first virtual reality headset has a first transmitter and a first receiver, the second virtual reality headset has a second transmitter and a second receiver, the first transmitter communicating with the second receiver and the second transmitter communicating with the first receiver and each participant able to interact with the simulated world.

15. The apparatus of claim 14 including an established network with a host computer having an associated transmitter and receiver which is in communication with all the virtual reality headsets, the host computer receives transmissions from the virtual reality headsets and transmits transmissions to the receivers of all of the virtual reality headsets through the network.

16. The apparatus of claim 15 wherein anything within the structure is in the near field, and anything outside of the structure is in the far field.

17. A method for a first participant and at least a second participant viewing in a structure comprising the steps of: the first participant and the second participant walking around together in a virtual world shown to the first participant by a first virtual reality headset worn by the first participant and shown to the second participant by a second virtual reality headset worn by the second participant, the virtual world is an entire world around them that is simulated and displayed in each virtual reality headset, the first participant and the second participant are in physical sight of each other in the structure and see each other in the structure in the virtual world while viewing the virtual world; and the first participant and the second participant seeing the virtual world from their own correct perspective in the structure, the first virtual reality headset having an inertial motion unit, a first computer, and at least a first camera, the second virtual reality headset having an inertial motion unit, a second computer, and at least a second camera, there is a marker attached to the structure for the first and second virtual reality headsets to determine locations of the first and second participants wearing the first and second virtual reality headsets, respectively, in the structure and their own correct perspective in the structure, there is coloring on at least a portion of the structure so the portion of the structure with coloring does not appear in the simulated world, the simulated world includes a near field and a far field, the first participant and the second participant interact differently with the near field than the far field.

\* \* \* \* \*